United States Patent Office 3,383,331
Patented May 14, 1968

3,383,331
CLAY-SUPPORTED CRACKING CATALYST
James E. McEvoy, Morton, and George Alexander Mills, Swarthmore, Pa., assignors to Air Products and Chemicals, Inc., Philadelphia, Pa., a corporation of Delaware
No Drawing. Filed May 20, 1965, Ser. No. 457,517
2 Claims. (Cl. 252—457)

ABSTRACT OF THE DISCLOSURE

Impact resistance and attrition resistance of a cracking catalyst particle are improved by incorporating 0.5% to 2% calcium carbonate into a precursor mixture comprising a major amount of clay, water, and alumino silicate molecular sieve providing in the calcined catalyst 4 to 25% sieve; and converting such precursor mixture to an attrition resistant catalyst particle by steps comprising shaping, calcining, and cooling.

---

This invention relates to the manufacture of cracking catalyst prepared by calcination of a precursor comprising a clay carrier and an ammonium zeolite and is concerned primarily with the impact resistance of such a catalyst particle.

In accordance with the present invention, a clay supported zeolitic cracking catalyst is modified by the incorporation of at least 0.5% but less than 2% of a carbonate of the group consisting of calcium carbonate and magnesium carbonate and mixtures thereof. Such alkaline earth carbonate is admixed with the clay carrier prior to particle formation, whereby the calcined particles possess superior resistance to impact and form less undersized material in the air jet test than particles omitting such alkaline earth carbonate hardener. The zeolitic component is always incorporated in the clay mixture prior to the formation of the precursor particle and must be present in a concentration from about 4% to about 25% of the impact-resistant particle of the present invention. Although the presence of calcium and/or magnesium compounds in large amounts brings about a significant deactivation of the zeolitic component, it has been found surprisingly that the zeolitic component retains its catalytic features when the alkaline carbonate hardener is present within the concentration range from 0.5% to 2%. The precursor is dried and subjected to a stabilizing treatment at 1300 to 1500° F. in the presence of at least 20% steam, which stabilizing step is sometimes designated as a calcining step.

In previous literature pertinent to the use of hydrogen zeolite as a cracking catalyst, there has been a recognition that the product resulting from heat treatment of an ammonium zeolite generally has an ion exchange capacity measurably less than the ion exchange capacity (sometimes expressed as meq./g.) of the ammonium precursor, such loss of ion exchange capacity sometimes being designated as decationization. The acidity subsequent to calcination, if sufficient to permit use of the calcined product as a cracking catalyst, has been accepted as the important characteristic without discussion of the inherently concurrent decationization. During the decades of evolution of various proposed cracking catalysts, some of the earlier ammonium zeolites were amorphous. Some of the crystalline ammonium zeolites such as ammonium natrolite which were studied by cracking technologists at an earlier date provided hydrogen zeolites with small pores. Modern technology has recognized the advantage of employing faujasite, neo-mordenite, and related crystalline zeolites having an average pore diameter greater than 10 Angstroms. Now it has been established that the calcination of ammonium faujasite by itself or incorporated with a matrix such as kaolin clay, at temperatures of a magnitude of 1300° F. in the presence of steam to provide an anhydrous sorptive product can provide pores greater than 10 Angstroms. The diluted decationized hydrogen faujasite will have large pores if the silica to alumina ratio in the zeolite is within the range between 3 to 1 and 6 to 1 conveniently designated as a unit ratio range from 3 to 6 and only if the matrix enhances the stability of the faujasite. Inasmuch as natural faujasite is rare, all discussion thereof concerns crystalline zeolite having density, pore size, X-ray diffraction characteristics resembling natural faujasite but prepared synthetically. Sodium faujasite is commercially available material. Synthetic sodium faujasite having a silica to alumina unit ratio within the range from 3 to 6 is suitable as a precursor for cracking catalyst, and is marketed as Zeolite Y. Difficulty has been encountered in imparting adequate impact resistance to clay supported hydrogen faujasite cracking catalyst so that there has been a continuing search for techniques for imparting commercially attractive impact resistance to such materials.

Granular catalyst is consumed in part by the action of the gas lift, in which the jet of hot gas lifts each particle under conditions such that the impact with other particles and/or baffle members promotes fractures of the particles. The ability of a granular particle to withstand such forces can be designated as impact resistance and can be measured by any of several standard air jet testing procedures. Petroleum technologists have recognized that the replacement rate necessary for maintaining a moving bed of catalyst particles in refinery operations corresponds more closely to the predictions based upon measurements of impact resistance than to the predictions relying merely upon measurements of attrition resistance. Thus, one of the standard impact tests using an air jet has gained increasing emphasis, notwithstanding continued use of the ball mill test for attrition resistance. Terms such as "hardness" have created confusion because sometimes used to designate crushing strength, sometimes used to designate attrition resistance, sometimes used to designate impact resistance, and sometimes used to designate some other property or combination of properties.

In the test for measuring the grinding action of particles against each other in a tumbling drum or ball mill, the large particles at the end of the test have been measured and test results have been expressed as a percentage of the starting material. However, in the air jet test, the undersized material resulting from the prolonged air jet test is measured and reported as a percentage of the starting material. The theoretically perfect catalyst would have a 100% rating in the ball mill test and would have a 0% rating in the air jet test.

The catalyst testing procedure is a standard procedure set forth in U.S. Patent 3,337,474.

The nature of the invention is clarified by reference to a plurality of examples:

Examples 1–3

Several cracking catalysts were prepared in which the significant variable was the concentration of the calcium carbonate hardener. In the principal control operation, designated as A in Table I, no hardener was employed. In a tangential independent experiment, ammonium carbonate in a concentration of 2% was employed to increase the alkalinity of the mixture to pH 9.2 from pH 5.5 for the wet clay, whereby it was established that calcium salt, not merely alkalinity, was necessary to achieve the desired quality in the air jet test. Precursor particles containing a major amount of clay and scheduled for conversion by calcination into attrition resistant particles conventionally containing a liquid imparting plasticity to the mixture. Water is ordinarily such liquid, and the presence of water is connoted by reference to the pH of the wet precursor mixture.

The particles thus relying upon 2% ammonium carbonate as hardener had an air jet rating of 57.4, or worse than the pellets containing as little as 0.5 calcium carbonate. It was noted that calcium carbonate addition imparts a pH of about 8.9 to the mixture.

The ammonium faujasite for each catalyst was prepared by subjecting synthetic sodium faujasite to ion exchange with an aqueous solution of ammonium nitrate. If the sodium faujasite is treated with more than a 200% stoichiometric excess of ammonium, it is deemed to be substantially free from exchangeable metallic ions even though more sodium might be removed by still more extreme ion exchange treatments. The amount of ammonium faujasite incorporated in the plastic mixture corresponded to 8% hydrogen faujasite in the calcined catalyst except control catalyst A which contained 10%. In each case, the catalyst prior to the catalyst testing procedure was subjected to an appropriate stabilization treatment followed by an accelerated aging treatment equivalent to maintaining in 50% steam at 1550° F. for 4 hours, a severity of treatment sufficient to seriously deactivate many prior art cracking catalysts containing faujasite type material.

The results obtained by said series of four catalysts are shown in Table I and Table II.

TABLE I

| Hardening Agent | Cat. D-1 | | | | | |
|---|---|---|---|---|---|---|
| | Gasoline | Coke | Gas | Gas Gravity | Conversion | Selectivity |
| A ...... None ........... | 57.4 | 2.5 | 16.2 | 1.54 | 69.2 | 73 |
| (1) ..... 0.5% CaCO₃ ... | 55.7 | 2.2 | 13.9 | 1.48 | 65.1 | 75.2 |
| (2) ..... 0.75% CaCO₃ .. | 57.6 | 2.3 | 13.8 | 1.50 | 66.8 | 76.0 |
| (3) ..... 1% CaCO₃ ..... | 58.3 | 3.0 | 17.8 | 1.55 | 72.2 | 71.2 |

TABLE II

| Hardening Agent | Ball Mill Hardness, Percent | Air Jet |
|---|---|---|
| A .......... None ............ | 90.5 | 83.1 |
| (1) ............ 0.5% CaCO₃ ...... | 94.1 | 44.1 |
| (2) ............ 0.75% CaCO₃ ..... | 94.0 | 35.1 |
| (3) ............ 1% CaCO₃ ........ | 95.6 | 30.7 |

Because the presence of the CaCO₃ in the catalyst precursor imparted impact resistance (evidenced by the lower air jet loss) without unduly impairing the catalyst performance, the data were interpreted as showing that CaCO₃ is a useful hardening agent for zeolite cracking catalysts.

Example 4

By a series of tests it is established that either magnesium carbonate or mixtures of calcium carbonate and magnesium carbonate may be employed as equivalents of calcium carbonate in achieving impact resistant catalyst particles by a procedure otherwise corresponding to Examples 1–3.

Obviously many modifications and variations of the invention as hereinbefore set forth may be made without departing from the spirit and scope thereof, and therefore only such limitations should be imposed as are indicated in the appended claims.

What is claimed is:

1. A method of preparing a clay supported zeolitic cracking catalyst comprising the steps of: preparing a mixture consisting essentially of a major amount of clay, a quantity of zeolitic alumino-silicate providing in the calcined catalyst particle a concentration of zeolitic alumino-silicate molecular sieve within the range from 4% to 25% by weight of the cracking catalyst particle, said zeolitic alumino-silicate molecular sieve being substantially free from base-exchangeable metallic cations and having a silica to alumina ratio greater than 3 to 1 and less than 6 to 1 and having crystalline pores of a diameter greater than 10 Angstroms, from 0.5% to 2% by weight of an alkaline earth carbonate selected from the group consisting of calcium carbonate, magnesium carbonate and mixtures thereof, and liquid imparting plasticity to the mixture; shaping the mixture into particles; drying the particles; calcining the dried particles at a temperature above 1300° F. and below about 1500° F. in a gas stream comprising steam in a volume concentration of at least 20% for at least 1 hour but less than 8 hours; and cooling the particles to provide cracking catalyst particles.

2. In the method of making cracking catalyst particles in which a zeolitic alumino-silicate is admixed with wet clay to provide from 4 to 25% by weight in the cracking catalyst particle, formed into particles, and stabilized at a temperature above 1300° F. and below 1500° F. in the presence of at least 20% steam, the improvement which consists of enhancing the impact resistance of the particles by incorporating from 0.5% to 2% by weight calcium carbonate in the admixture prior to particle formation.

References Cited

UNITED STATES PATENTS 2,958,647  11/1960  Hirschler _____ 252—457 X
3,234,147   2/1966  Drost et al. _____ 252—455
3,291,754  12/1966  Hanisch et al. _____ 252—455

DANIEL E. WYMAN, Primary Examiner.

C. F. DEES, Assistant Examiner.